United States Patent [19]

Mercurio

[11] 3,980,991
[45] Sept. 14, 1976

[54] APPARATUS FOR CONTROLLING MICROPROGRAM JUMPS IN A MICROPROGRAMMABLE ELECTRONIC COMPUTER

[75] Inventor: Luigi Mercurio, Ivrea (Turin), Italy

[73] Assignee: Ing. C. Olivetti & C., S.p.A., Ivrea (Turin), Italy

[22] Filed: Nov. 29, 1974

[21] Appl. No.: 527,975

[30] Foreign Application Priority Data
Dec. 28, 1973 Italy .................................. 70874/73

[52] U.S. Cl. ............................................ 340/172.5
[51] Int. Cl.² ............................................ G06F 9/16
[58] Field of Search ............. 340/172.5; 445/1; 444/1

[56] References Cited
UNITED STATES PATENTS

| | | | |
|---|---|---|---|
| 3,560,933 | 2/1971 | Schwartz | 340/172.5 |
| 3,570,006 | 3/1971 | Hoff et al. | 340/172.5 |
| 3,699,526 | 10/1972 | Iskiyan et al. | 340/172.5 |
| 3,713,108 | 1/1973 | Edstrom et al. | 340/172.5 |
| 3,745,533 | 7/1973 | Erwin et al. | 340/172.5 |
| 3,760,369 | 9/1973 | Kemp | 340/172.5 |
| 3,793,631 | 2/1974 | Silverstein et al. | 340/172.5 |

Primary Examiner—Mark E. Nusbaum
Attorney, Agent, or Firm—I. J. Schaefer

[57] ABSTRACT

An apparatus for controlling jumps in microprograms in a microprogrammable electronic computer. The apparatus comprises a plurality of bistable circuits. Selected words are transferrable into the bistable circuits in response to the execution of microprograms by the computer and at least one bistable circuit can be set to a state determined by whether a logical condition specified by a microinstruction is or is not met. In response to the state of a selected one of the bistable circuits, a jump in a microprogram may alternatively be or not be effected. The jump is dependent upon the state of the selected bistable circuit and independent of whether this state has been established by a transferred selected word or as a result of a logical condition.

2 Claims, 2 Drawing Figures

3,980,991

APPARATUS FOR CONTROLLING MICROPROGRAM JUMPS IN A MICROPROGRAMMABLE ELECTRONIC COMPUTER

BACKGROUND OF THE INVENTION

The present invention relates to an electronic computer including a device for controlling jumps in microprograms, comprising a central unit controlled by the microprograms. The central unit comprises a plurality of bistable circuits for memorizing predetermined binary conditions of the microprograms, and means for transferring the predetermined conditions into the bistable circuits.

It is known during the development of microprograms it is often necessary to analyze conditions generated by particular microinstructions to condition the development of the microprogram itself, i.e. to determine whether or not jumps are to take place.

For example, microinstructions of logical type, (AND, OR, exclusive OR, etc.), memorize in particular registers of the central unit the result of the executed logical operation. Such a result is composed of one bit which takes one of the two possible logical values corresponding to the result obtained. In particular, if the operation carried out by the microinstruction is an exclusive OR between two words of eight bits, the result may be 0 or 1 according to whether the two words are the same or different, respectively. Such a result as stated is memorized by the microinstruction directly into a special flip-flop or register at a cell allocated in the central unit.

Another case which frequently occurs is that of having to analyze, during the development of a microprogram, the content of particular words, for example words of eight bits, which specify particular conditions of the program during its execution. Such words are normally compiled from instructions of the program or else by the effect of a command from the computer console.

With each bit in such a word there is associated information significant for execution of the microprogram. This involves, therefore, the need to be able to determine the logical level reached by them. In order to do this, the technique usually employed is to transfer into a register of the central unit the entire word, to zeroize by means of a so-called "mask" all the bits except those whose logical level it is desired to test, and then to analyze those bits by means of an AND microinstruction.

For example, if it is desired to analyze the third bit of a word, the latter is transferred to a register, an AND microinstruction is carried out between the word registered in it and a marked word which has the third bit at the level 1 and all the other bits at the level 0. Consequently the result of the AND is a bit which takes the level 1 or 0 according to whether the third bit of the word being analyzed is at the level 1 to 0 respectively.

Such a bit is memorized as already stated by a flip-flop of the central unit, and is then analyzed by special microinstructions for conditioning jumps which test the content of such a flip-flop for carrying out or leading the jump to a predetermined address. It is evident that this kind of technique has the disadvantage of being slow and laborious.

In a known computer, such as that disclosed in U.S. Pat. No. 3,793,631, there is provided an eight bit designator register adapted for storing five particular conditions reached in the course of the program and having a group bit manipulation instructions for setting or resetting an addressed bit of the register. These bits are: zero, positive link, overflow and flag. The limitation of this device becomes apparent during the execution of a BRANCH instruction. In fact, only the FLAG bit is directly testable by the BRANCH instruction while the other bits of the register, previously requires the execution of one of the following instructions:

SET FLAG IF BIT TRUE
SET FLAG IF BIT FALSE
RESET FLAG IF BIT TRUE
RESET FLAG IF BIT FALSE

It follows that the execution of a jump instruction on a condition specified by a bit different from the FLAG bit requires two instructions:

SET FLAG IF BIT TRUE
BRANCH ON FLAG TRUE.

SUMMARY OF THE INVENTION

These and other disadvantages are resolved by the present invention, which provides in a programmable electronic computer apparatus for controlling jumps in microprograms, comprising a central unit controlled by the microprograms, a plurality of bistable circuits for memorizing predetermined binary conditions of the microprograms, means for transferring selected words into the bistable circuits, means for transferring the predetermined conditions into the bistable circuits, the transferring means comprising means for selecting at least one of the plurality of bistable circuits, means for writing into the selected bistable circuit a binary signal associated with one of the predetermined condition and means responsive to the state of a selected one of the bistable circuits to alternatively effect or not effect the jump in the microprogram to control the address of a succeeding microinstruction of the microprogram.

Briefly the major feature of the invention consists of providing a specialized hardware capability permitting the test and the jump operation that may be executed by only one microinstruction (SADO or SADI), the test being executed over the bit of the control flip-flops 30 addressed by the field DEV of the microinstructions.

The characteristics of the invention will be more evident from the following description, given by way of non-limiting example, with reference to the accompaying drawings.

DESCRIPTION OF THE PREFERRED EMBODIMENT

Figure 1:
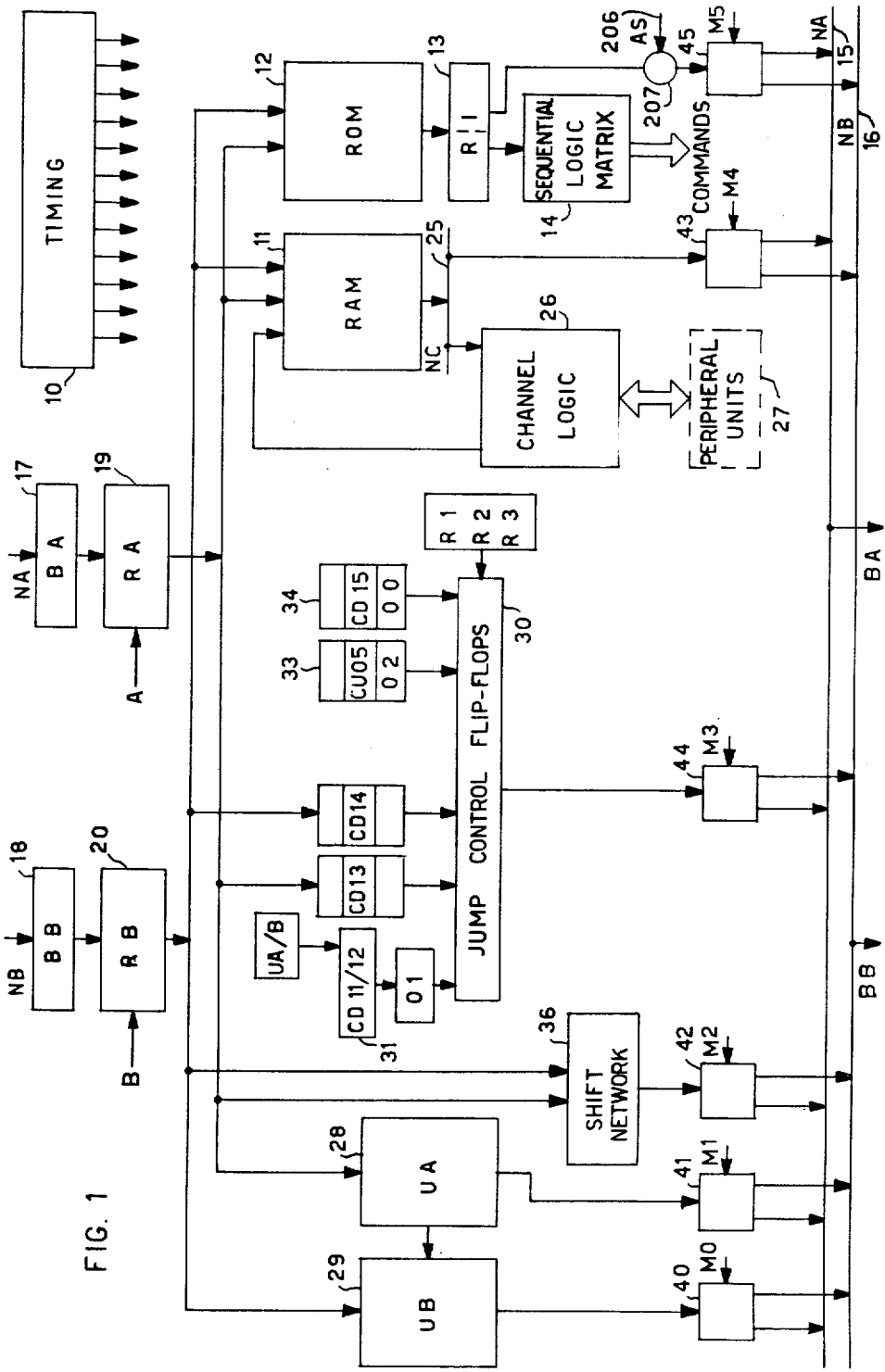
FIG. 1 is a block diagram of the computer embodying the invention.

With reference to FIG. 1 the functional blocks will now be described of a computer utilizing the device according to the invention. This is composed of a timing unit 10 which times the operation of executing the data within the arithmetic unit, a read and write memory RAM 11 which contains the data and the instructions of the programs and a read only memory ROM 12 which contains the microprograms designed to carry out the instructions of the RAM 11.

The ROM 12 is linked with an instruction register 13 of sixteen bits which holds in succession the codes of the microinstructions read from the ROM 12. The register 13 is linked to a sequential logic matrix 14 which specifies and interprets the codes of the microinstructions read from the ROM 12, and generates the commands required for their execution.

The output of the RAM 11 is linked to two data lines NA 15 and NB 16 which are linked to the inputs to two corresponding registers BA 17 and BB 18. The latter are linked respectively with a group of working registers RA 19 and RB 20 designed to hold the data or the addresses of the operands furnished by the RAM 11. RA and RB each contain 16 8-bit registers addressable by a four bit address.

The functions of the registers RA 19 and RB 20 include that of providing the addresses of the ROM 12 associated with the microprograms which carry out the instructions read from the RAM 11.

The output of the RAM 11 is also linked through a data line NC 25 with a channel-selection logical network 26 which generates all the commands required for controlling the transfer of data and commands to a group of peripheral units 27.

The outputs of the registers RA 19 and RB 20 are also connected to two arithmetic units UA 28 and UB 29, whose outputs are in turn connected to the data lines NA 15 and NB 16. The arithmetic units UA 28 and UB 29 operate with eight bits in parallel and make it possible to carry out all arithmetical and logical operations on data furnished by the registers RA 19 and RB 20. The unit UB 29 can be operated as an extension of UA 28 whenever the operands are of double length.

The registers RA 19 and RB 20 can in addition be linked with a group of eight flip-flops 30 of D-type which form the jump control device for the microprograms; in what follows the flip-flops 30 will be identified collectively by 30, and by DI 00 - DI 07 (FIG. 2) when they are mentioned individually. The flip-flops 30 receive as inputs through the gating circuits 31, 32, 33 and 34, the outputs of UA 28 and UB 29 or else outputs from one of the registers RA 19 and RB 20.

The output of the flip-flops 30 is linked to the data lines NA 15 and NB 16. The computer comprises also a shift network 36 which executes all the shift and cyclic shift operations on the eight bits arriving from the registers 19 and 20 or else can transfer the data to its output without alteration. This shift network 36 is connected to the data lines NA 15 and NB 16 through gates 42, and then to the registers RA 19 and RB 20.

Access to the data lines NA 15 and NB 16 is effected by switching circuits or gates 40, 41, 42, 43, 44, and 45 which are controlled by the sequential logic matrix 14 for transferring the data present at their inputs either on the data line NA 15 or the data line NB 16 in response to commands M0 to M5.

The flow of data between the blocks as described is regulated by the commands generated by the sequential logic matrix 14, and is synchronized by the signals generated by the timing unit 10. The way in which this transfer is managed will not be described in detail since it is carried out in a known manner, as for example as described in Digital Computer Design Fundamentals by Y. Chu, McGraw-Hill Book Co., 1962. In paragraph 5.13 (page 209) is described the timing Circuit 10; the logic matrix 14 is described in paragraph 12.8 (page 265). Moreover, in the book "Microprogramming: principles and Practices" By Samir S. Husson, Prentice Hall, Inc., 1970 are disclosed all details relating to the channel logic 26 (see paragraph 8.14, page 333) and the UA-28, UB-29 (see paragraph 7.2.2 page 227). Other details relating registers, read only memory and other components shown as a black block in this specification, may be found in the above mentioned book.

Figure 2:
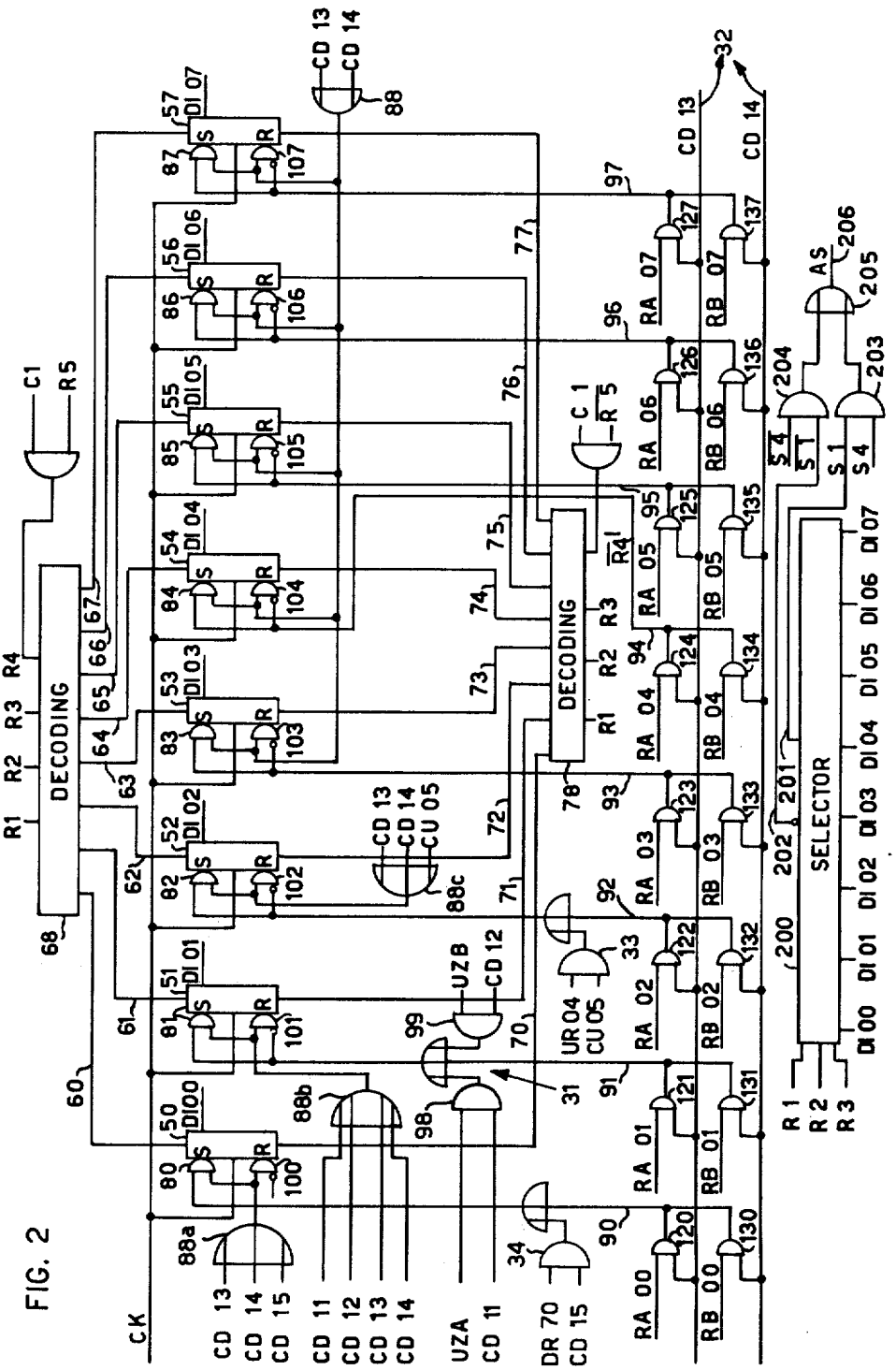
FIG. 2 shows a detailed diagram of the jump control unit of the computer.

There will now be described in detail with reference to FIG. 2 the method by which the jump control flip-flops 30 are controlled.

The flip-flops 30 consist of eight flip-flops of D-type 50-57 which are normal set-reset flip-flops in which the input "reset" is the negation of the input "set". The flip-flops 50-57 are synchronized by a timing signal CK generated by the timing unit 10.

Their direct clocked inputs are linked to eight conductors 60-67, which come from a decoding circuit 68. This decoding circuit 68 has as inputs three signals R1, R2, and R3, generated by the sequential logic matrix 14 and an enabling signal R4 which constitutes the logic AND of a command C1 and a signal R5 also both generated by the sequential logic matrix 14.

Similarly the clocked reset inputs of the flip-flops 50-57 are linked to eight conductors 70-77 which come from a second decoding circuit 78, whose inputs are composed of the signals R1, R2, and R3 whose enabling signal $\overline{R4}$ is obtained from the logic AND of C1 and the negation of the signal R5 ($\overline{R5}$).

The outputs 60 to 67 and 70 to 77 of the decoding circuits 68 and 78 respectively are normally all at the logical level 1. One such output may be addressed by the signals R1, R2 and R3 in the presence of the appropriate microninstruction. The addressed output assumes the logical level 0 and in this way it is possible to set or reset any single addressed jump flip-flop.

The setting inputs of the flip-flops 50-57 are constituted by AND gates 80 to 87 for the direct set inputs and 100 to 107 for the negated resetting inputs. Lines 90 to 97 apply either the bits RA 00 to RA 07 from register RA 19 or the bits RB 00 to RB 07 from register RB 20, depending upon whether CD 13 enables gates 120 to 127 or whether CD 14 enables gates 130 to 137, to the gates 80 to 87 and, with inversion to the gates 100 to 107. The gates 120 to 127 and 130 to 137 are the gating circuits 32 of FIG. 1.

To this end all of the gates 80 to 87 and 100 to 107 are enabled by CD 13 or CD 14 by way of OR gates 88, 88a, 88b and 88c. The contents of RA 19 or RB 20 may thus be copied into the flip-flops 50 to 57.

In addition, the OR gate 88a for the flip-flop 50 (DI 00) can be enabled by CD 15 to allow a signal DR 70 to be written in via AND gate 98 in the presence of CD 15 via AND gate 34. The signal DR 70 is generated by the arithmetic unit UA 28 when this produces a carry from the eighth bit. DI 00 can thus be conditioned to two distinct modes, either in accordance with RA 00 or RB 00 (in the presence of CD 13 and CD 14 respectively) or in accordance with the carry bit DR 70 (in the presence of CD 15 to enable gate 34).

The OR gate 88b for the flip-flop 51 (DI 01) can also be enabled by CD 11 or CD 12 to enable UZA to be written in via AND gate 98 in the presence of CD 11 or UZB to be written in via AND gate 99 in the presence of CD 12. The gates 98 and 99 correspond to the gating circuit 31 or FIG. 1. The signals UZA and UZB are generated by the arithmetic units UA 28 and UB 29 respectively when the result of an arithmetical or logical operation is zero, in which case the UA 28 generates UZA=1 or the unit UB 29 generates UZB=1, DI 00 can thus be conditioned either by RA 01 or RB 01, or by UZA or UZB.

Finally, the OR gate 88c for the flip-flop 52 (DI 02) can also be enabled by CU 05 to enable a signal UR 04 to be written in via AND gate 33. UR 04 is generated by the unit UA 28 when there is a carry from the fourth to the fifth bit therein. DI 02 can therefore either be conditioned by RA 02 or RB 02, or by UR 04.

From what has been said it is clear how the flip-flops 50, 51, and 52 are used for storing the results of the logical or arithmetical operations developed by the units UA 28 and UB 29. For example, if during a microinstruction of addition between the contents of the two function registers, a carry is generated after the 4th bit, the arithmetic unit generates the signal UR 04. In this way there will be on the conductor 92 a signal with level one, by which the AND gate 82 is enabled and the AND gate 102 disabled, and consequently the flip-flop 52 is forced to one.

The way in which the sequential logic matrix 14 generates the commands and the signals cited above is not described in detail, since they do not constitute the object of the present invention. Also it is a known technique in planning circuits to design a logical matrix based on the codes for the microinstructions and on the operations which they have to carry out.

The outputs DI 00 - DI 07 are connected to a selector 200 (FIG. 2) for which the enable signals are R1, R2, and R3. The selector 200 is designed for selecting one of its eight inputs based on the signals R1, R2, and R3. There will however be present on its outputs 201 and 202, the logical level S1 and its negation $\overline{S1}$ respectively of the signal present on the selected input. The outputs 201 and 202 are in turn connected to two AND gates 203 and 204 which are enabled by signals S4 and $\overline{S4}$ generated by the matrix 14. These AND gates are in turn connected to an OR circuit 205 whose output 206 (AS) enables a gate circuit 207 (FIG. 1). The latter permits transfer of the address stored in the second half of the register 13 on to the data line NA or NB during a jump microinstruction.

We shall now describe the method of operation of the jump flip-flops 30 used for conditioning the jumps during the execution of a microprogram.

In particular, the sequential logic matrix 14 is capable of recognizing a predetermined microinstruction TADI with the function code 1011 A 1110 0111 which effects transference into the flip-flops of the contents of the working register RA 19 indicated by the four bits of the field A.

During a first phase of the microinstruction TADI, there is read in known manner the contents of the register RA 19 selected by the field A of the microinstruction, and transferred to the input conductors of the AND gates 120-127 by means of the signals RA 00-RA 07. After this the maxtrix 14 generates the signal CD 13 which enables transference of the signals RA 00-RA 07 to the AND gates 80-87 and 100-107 of the flip-flops 50-57. In this way the outputs DI 00-DI 07 of the latter are set according to the signals RA 00-RA 07. Similarly, the flip-flops 50-57 are positioned according to the signals RB 00-RB 07 if the matrix 14 generates the signal CD 14 following recognition of the microinstruction TBDI.

Let us assume now that it is required to bring the level "1" or "0" one of the flip-flops 50-57. For this purpose the microinstructions SEDI and REDI are available, having respectively the following format:
SEDI = 10011 1 DEV 0110 0110
REDI = 10011 0 DEV 0110 0110

Assuming that the matrix 14 recognizes SEDI, it generates the signals R1, R2, and R3 which are the three bits indicated by DEV in the microinstruction, and the signal R5 = 1 which is generated directly by the 5th bit from the left of the microinstruction SEDI. Besides this, the matrix 14 generates the signal C1. If, for example, the three bits DEV indicate the fifth flip-flop (flip-flop 54), their configuration will be 101, for which the decoding circuit 68 activates only the output 64, and hence at the instant of CK the flip-flop 54 is forced to one. In this way it is possible to set in general one or other of the flip-flop 50-57 and hence to modify the individual bit of a word. This is particularly useful when, for example, it is desired to modify, during the changing of a microprogram, a particular condition to be used in continuation. As can be seen this has been done with a single microinstruction without the necessity of using "masking" codes.

Similarly, if it is desired to reset one of the flip-flops 50-57 by means of the microinstruction REDI, the 5th bit enables the signal $\overline{R5}$ which activates the decoder 78 which resets the flip-flop 54 of the cited example.

We shall now describe the functioning of the jump flip-flops 50-57 in the case in which it is desired to execute a jump conditioned by a particular bit of a word.

In order to proceed as explained above, there is transferred by means of a microinstruction TADI or TBDI the contents of a register RA 19 or RB 20 respectively into the flip-flops 50-57. Then, by means of a microinstruction SADO or SADI, the addressed flip-flop is tested, and the jump is carried out in dependence upon the state of the flip-flop. In particular, the format of such microinstruction is: SADO = 0010 0 DEV XXXX XXXX and SADI = 0011 0 DEV XXXX XXXX, in which the final eight bits represent the address of the jump which will be forced into the address register of the microprogram (which is allocated for example in one of the function registers RA 19 and RB 20) if the condition is verified.

If we assume that it is necessary to execute a jump in the address 0011 0111 if the flip-flop DI 05 (i.e., the flip-flop 55) is at the level one, in this case the 4th bit of the microinstruction is at the level 1 (to denote SADI) and the bits DEV are = 110.

Assume now that the condition is verified, i.e. that the output DI 05 of the deviator flip-flop 55 is at the level 1. The selector 200 selects the input DI 05 by means of the signals R1 = 1, R2 = 1, R3 = 0 generated by the matrix 14 using the address DEV = 110 of the microinstruction. The outputs S1 and $\overline{S1}$ present on the conductors 201 and 202 will be respectively at 1 and 0 if DI 05 = 1, and conversely $\overline{S1}$ = 0 and S1 = 1 if DI 05 = 0. The signals S4 and $\overline{S4}$ will be at 1 and 0 if the microinstruction (SADI) is a jump under the condition DEV = 1 conversely S4 = 0 and $\overline{S4}$ = 1 if the jump is under the condition DEV = 0, i.e. the microinstruction is SADO.

In this way, if there is concordance between the pair of signals S1 and S4 or $\overline{S1}$ and $\overline{S4}$, i.e. if the condition is verified, the AND gate 203 or 204 are activated to generate AS. In this way the address registered in the second half of the register 13, i.e. 0011 0111 can pass through the gate 207, since the signal AS is brought to 1 on the wire 206; hence the address is transferred to the data lines NA 15 or NB 16.

From the data line NA 15 or NB 16 the address of the jump is transferred into the register RA or RB in a precedence selected by the microinstruction. This register therefore contains the address of the jump 0011 0111 at which the microinstruction which is to be followed will be read.

It therefore is apparent from what has been said above how it is possible to carry out a jump to a condition by selectively addressing one bit of one word.

It is also clear how the jump control flip-flops are utilized, either as normal circuits specifying the results of arithmetical and logical operations, or as specifiers of more individually, either for setting them or for testing their content in order to control the operative sequence of the microprograms.

What we claim is:

1. In a microprogrammable electronic computer:

means for storing data comprising a plurality of bistable circuits;

means for storing a plurality of microinstructions;

means for generating state defining words;

means for transferring a selected state defining word to the bistable circuits in response to the execution of one of said plurality of microinstructions by the computer;

means for selecting one of the bistable circuits which have the selected state word stored therein and setting or resetting same according to one of said plurality of microinstructions to define a jump condition; and means controlled by a jump microinstruction for executing a conditional jump or a jump address specified by said jump microinstruction, said means comprising first means controlled by a first field of said jump microinstruction for addressing any one of said bistable circuits, second means controlled by a second field of said jump microinstruction for generating a condition signal for specifying a predetermined jump condition, third means responsive to said first and second means, for testing whether the state of the condition signal corresponds to the state of the addressed bistable circuit, and fourth means responsive to the correspondence in said third means for executing a jump at said jump address specified by said jump instruction.

2. In a microprogrammable electronic computer according to claim 1, further comprising an addressing register for addressing the next microinstruction to be executed, a microinstruction register comprising a jump address position for storing the jump address specified by said jump microinstruction, decoding means having an output and a plurality of inputs connected to the outputs of said bistable circuits and controlled by a plurality of signals included in said first field of said jump microinstruction for selecting one of the outputs of said bistable circuits at the output thereof, wherein said third means includes means for generating a command signal when the binary information stored in said bistable circuits is equal to the condition specified by said jump microinstruction, and wherein said fourth means comprises means controlled by said command signal for connecting said jump address position of said microinstruction register to said addressing register.

* * * * *